(12) United States Patent
Gnaneswaran et al.

(10) Patent No.: US 11,645,191 B2
(45) Date of Patent: *May 9, 2023

(54) REVIEW PROCESS FOR EVALUATING CHANGES TO TARGET CODE FOR A SOFTWARE-BASED PRODUCT

(71) Applicant: VMWARE, INC., Palo Alto, CA (US)

(72) Inventors: Dinesh Babu Thirukondan Gnaneswaran, Bangalore (IN); Aishwary Thakur, Bangalore (IN); Ayesha Karim, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 17/331,502

(22) Filed: May 26, 2021

(65) Prior Publication Data

US 2021/0342251 A1    Nov. 4, 2021

Related U.S. Application Data

(63) Continuation of application No. 16/576,783, filed on Sep. 20, 2019, now Pat. No. 11,023,358.

(30) Foreign Application Priority Data

Jul. 19, 2019    (IN) .............................. 201941029225

(51) Int. Cl.
    *G06F 11/36*      (2006.01)
    *G06N 20/00*      (2019.01)
    *G06Q 10/0639*    (2023.01)

(52) U.S. Cl.
    CPC ......... *G06F 11/3612* (2013.01); *G06N 20/00* (2019.01); *G06Q 10/06398* (2013.01)

(58) Field of Classification Search
    CPC .......... G06F 11/3612; G06Q 10/06398; G06N 20/00; G06N 5/003; G06N 20/20
    (Continued)

(56) References Cited

U.S. PATENT DOCUMENTS 8,255,362 B2    8/2012  Johnson
8,677,348 B1    3/2014  Ramanathpura
(Continued)

OTHER PUBLICATIONS

"Applying Machine Learning to Software Fault Prediction", e-Informatica Software Engineering Journal vol. 12, Issue 1 https://www.e-informatyka.pl/attach/e-Informatica_-_Volume_12/eInformatica2018Art8.pdf, 2018, 199-216.
(Continued)

*Primary Examiner* — John Q Chavis
(74) *Attorney, Agent, or Firm* — Clayton, McKay & Bailey, PC

(57) ABSTRACT

Systems and methods can implement a review process to evaluate changes to target code as part of development cycles for a continuous integration, continuous deployment pipeline for software-based products. The system can aggregate data and determine if the target code has been modified preliminarily and then intelligently determine where further review is needed before the changes are permanently implemented. To do this, a changeset including the preliminarily changed target code can be obtained from the aggregated data. The changeset can be tested with a prediction model based on feature data that characterizes aspects of a coding process carried out to generate the preliminary modification. The prediction model can provide an activation recommendation for the preliminary modification based on a plurality of risk factors determined from the testing. The prediction model can be trained, continuously, with training data that includes a plurality of data artifacts resulting from a code build processes.

20 Claims, 6 Drawing Sheets

US 11,645,191 B2

Page 2

(58) Field of Classification Search
USPC .......................................................... 717/131
See application file for complete search history.

(56) References Cited

U.S. PATENT DOCUMENTS

| | | |
|---|---|---|
| 8,990,783 B1 | 3/2015 | Yu |
| 11,023,358 B2 * | 6/2021 | Gnaneswaran ........ G06N 20/00 |
| 2016/0124795 A1 | 5/2016 | Shimizu |
| 2016/0239402 A1 | 8/2016 | Zieder |
| 2016/0274991 A1 | 9/2016 | Christodorescu |
| 2017/0116106 A1 | 4/2017 | Bakowski |

OTHER PUBLICATIONS

"'Automated Software Defect Prediction'", https://www.research.ibm.com/haifa/conferences/hvc2008/present/WeyukerOstrand_37.pdf; Haifa Verification Conference HVC '08,, Oct. 2008.

"GitPrime", https://www.gitprime.com/platform/code/; GitPrime, Inc., 2019.

"VRealize Code Stream", https://www.vmware.com/in/products/vrealize-code-stream.html; VMware, Inc., 2019.

\* cited by examiner

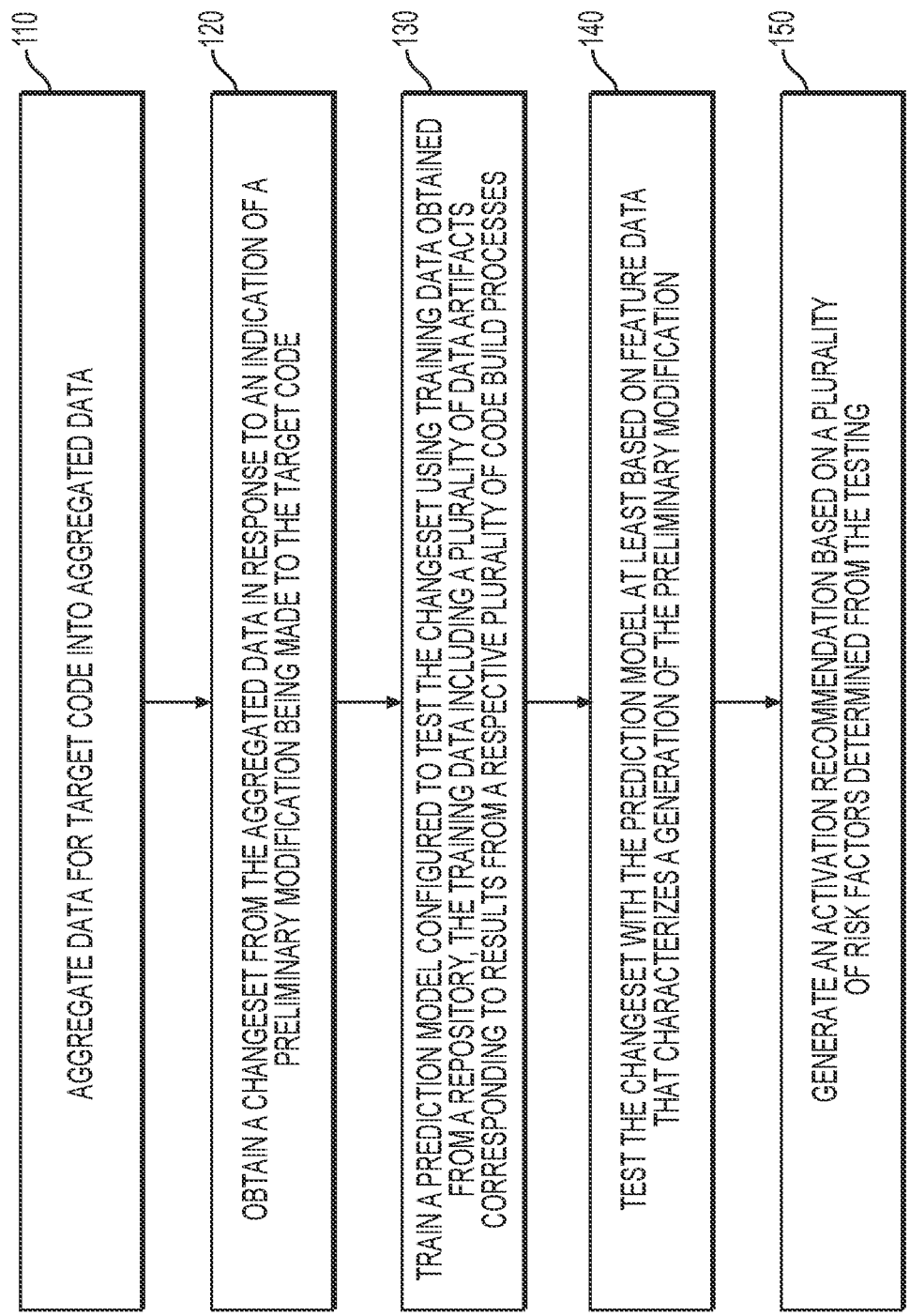

REVIEW PROCESS FOR EVALUATING CHANGES TO TARGET CODE FOR A SOFTWARE-BASED PRODUCT

RELATED APPLICATIONS

This application claims priority as a continuation of application Ser. No. 16/576,783, entitled "REVIEW PROCESS FOR EVALUATING CHANGES TO TARGET CODE FOR A SOFTWARE-BASED PRODUCT" and filed Sep. 20, 2019, which claims priority under 35 U.S.C. 119(a)-(d) to Foreign Application Serial No. 201941029225 filed in India entitled "REVIEW PROCESS FOR EVALUATING CHANGES TO TARGET CODE FOR A SOFTWARE-BASED PRODUCT", on Jul. 19, 2019, by VMWARE, INC., both of which are herein incorporated in their entireties by reference for all purposes.

BACKGROUND

Software products evolve over time as features are added or enhanced to optimize performance, provide new functionality, fix "bugs," or achieve other objectives. Features are added, fixed, or enhanced during an initial development stage and once the software product is released, through changes to the code that implements the software product. A software development life cycle includes the code development that goes into an initial release, and any subsequently released versions. In most cases, the quality of a software product is a critical factor that drives a decision to release an initial or subsequent version for a lifecycle of the software product. The lifecycle can be characterized as a continuous integration and continuous deployment ("CICD") pipeline.

It can be difficult to maintain both speed and quality during a CICD pipeline project. The IT industry is continuously accelerating development processes to deliver product features to obtain greater market share. Those that develop software products, especially as employees of a company, business, or enterprise (together referred to as "enterprise"), routinely attempt to achieve faster delivery cycles for both on-premise and SaaS products. These are software products that are implemented as part a computing system for the enterprise, or offered to customers by the enterprise to generate revenue.

In either case, increasing the speed of a delivery cycle for a software product can have a positive financial impact on the enterprise: employees may be provided with better tools that increase productivity sooner; or more products are sold to customers who value timely and useful software product updates. In both cases, code changes may be frequent, and it is imperative to keep quality intact, but restrictions on time may not allow for optimal development efforts and procedures.

Making any change to code that implements a software product poses a risk of negatively impacting quality. Code for a software product that is changed or added to as part of an incremental software development cycle ("development cycle") as part of a CICD pipeline, is referred to as a changeset. Each of the changes to code that make up a changeset can, and are likely to, impact multiple code operations. Often times, some of these impacts are not intended by an individual(s) or enterprise changing the code and implementing the changeset. In some cases, such changes increase a risk of, or in fact cause, fail events in which partial or total operational failure of a software product occurs. Detection and accurate assessment of a potential for these fail events would warrant blocking CICD pipeline execution. This would allow an opportunity to rectify a root cause of a problem stemming from the implementation of a changeset and causing the fail event.

However, an ability to make informed decisions on whether to implement changesets can be inhibited due to the cascading nature of effects that can result from changing one portion of code. Determining the full impact of one or more changes to code can also be hindered towards the end of a development cycle, as a release milestone approaches and time is at a premium. These pressures, coupled with a propensity to accept changes in code based on prior experience that is prone to human bias, often result in quality compromises. Even if a potential for a failure event is recognized before implementation, or after a fail event occurs, those responsible for rectifying an issue may be challenged to pinpoint a root cause of the problem. This can lead to making more than necessary changes to code, and thus increasing code churn.

Defects and fail events in the course of a development lifecycle (CICD pipeline execution) can increase based on the amount of code churn that occurs during the lifecycle. In particular, an amount of code churn resulting from feature enhancement, addition, updating, or repair may be proportional to defect probability and density. However, identifying potential failures in a software product that could result from code churn associated with a changeset is challenging and time consuming.

The importance of effectively analyzing a nature of and a risk factor associated with a changeset cannot be understated. These factors inform a developer or an enterprise administrator on a degree a code churn, and a probability of success in terms of minimizing further work, that can be expected from a full implementation of a changeset. However, without these aspects accurately analyzed, it is difficult to obtain a reliable (A) gauge for the difficulty, and (B) estimate of the time required, to conduct an effective changeset review process. In turn, devising a plan and optimal procedures for carrying out such a review process presents additional time-consuming challenges. In addition, although a CICD pipeline execution is a continuous process that builds on previous development cycles, review processes for the development cycles often include common processes that could potentially be automated. However, these common processes are performed by developers, reviewers, or other users (together "users") during each cycle, and limit the time that users have to focus on a core problem to be solved.

As a result, a need exists for systems and methods that provide insight into a changeset analysis. Specifically, a need exists for systems that allow for accurate pre-planning that avoids CICD pipeline failures and enable informed decision-making with respect to restricting pipeline execution of a changeset to improve the quality of deliverables and increase a speed at which the deliverables are produced.

SUMMARY

Examples described herein include systems and methods for implementing a review process for evaluating changes to target code for a software-based product. In one example, data associated with the target code can be aggregated. The aggregated data can include historic data characterizing past and current changes to the target code. Where an analysis of the aggregated data indicates that a preliminary modification has been made to the target code, a changeset can be obtained from the aggregated data.

In one example, a preliminary modification is a change to target code of a most recently released version of the software product. In another example, a preliminary modification is a change to target code of a most current version of the software product with respect to a development cycle, but not necessarily the same as the most recently released version. In either case, the preliminary modification is changed target code that may have been checked in by a developer or employee of an enterprise, but has yet to be implemented in a version of the software-based product. A changeset is a compilation of changed target code that corresponds to a preliminary modification. In simpler terms, a changeset is the difference, from a code perspective, between the software-based product without and with the preliminary modification.

A changeset associated a preliminary modification can be tested to determine a risk that implementing the changeset (implementing the preliminary modification) would cause failures in the operation or execution of the software product. An overall risk can be characterized by one more risk factors that can be determined by a prediction model. The changeset can be tested with a prediction model that is trained with data obtained from a repository, and includes data artifacts. The data artifacts may correspond to results obtained from multiple code build processes performed for the software product. In one example, the code build processes can include previous testing of target code for the software product by one or more prediction models, or other building and testing procedures that involved individuals responsible for developing or reviewed other changesets ("reviewers").

A prediction model may be evaluated before it is implemented to test a changeset. In one example, training data can be divided into first and second data subsets. The first data subset can be used to train a model and determine a validation score. The second data subset can be processed to determine a model accuracy score. Training of the prediction model can continue on an automatic basis until a variance between the validation score and the model accuracy score is within a predetermined range.

A changeset can be tested with a prediction model based on feature data that characterizes aspects of a process for generating the preliminary modification. In one example, feature data can include a number of files changed as part of creating the preliminary modification, or a number of files changed by the execution of software product including the preliminary modification. Other feature data can include a total number of patch sets uploaded and a total number of lines added and deleted in the same contexts (creation and execution) as applied to the number of files changed. In addition, feature data can include a number of reviewer comments and a list of reviewers for a changeset associated with the preliminary modification. The list of reviewers can based on past changesets. In another example, feature data that may be processed by a prediction model testing a changeset can include: an owner pass rate; a file pass rate; a reviewer pass rate; an execution status for the changeset; and a total number of lines of code inserted and deleted across all patch sets for the changeset.

A prediction model according to the present disclosure can be implemented to process feature data that encompasses all or any combination of the above, statistics, aspects, and other data associated with a preliminary modification. Feature data can be processed by a prediction model to determine one or more risk factors associated with a full implementation of a preliminary modification. Examples of risk factors that may be determined by the prediction model can include pass rate factors, relevance factors, recommendation reasons based on code churn, as well as review and reviewer efficiency statistics. In one example, values or contents associated with one or more of the determined risk factors can be provided, for example in a GUI, in response to an application programing interface ("API") call for that information.

The values and content associated with determined risk factors can, in one example, be used by a prediction model or system implementing the prediction model, to determine an activation recommendation. In one example, an activation recommendation can represent an initial overall evaluation of a changeset, a risk of failure associated with the changeset, and whether or not implementation is recommended. For example, the activation recommendation can recommend further coding review by one or more individuals before the changeset can be implemented. This can help prevent errors by focusing review on code features that are prone to causing failures, yet maintain an otherwise fast implementation time by focusing review where it is most warranted.

In other examples, values for the risk factors may be used or processed by a prediction model or system implementing the prediction model to estimate a review time for a secondary analysis of the preliminary modification involving a reviewer. Further, at least one determined risk factor may be utilized to generate a recommendation for a particular reviewer to be involved with a secondary analysis of the preliminary modification. In one example, a reviewer can be selected from a list of potential reviewers and displayed in a GUI along with the list. In addition to risk factors, other factors specific to reviewers that can be taken into account by systems and methods according to the present disclosure can include an estimated review time and reviewer performance data.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIG. 1 is a flowchart of an example method for implementing a review process for evaluating changes to target code for a software-based product.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods for implementing a review process to evaluate changes to target code for software-based products can aggregate data and determine if a preliminary modification is presented by the target code. A changeset, which includes a compilation of changed target code corresponding to the preliminary modification, can be obtained from the aggregated data. The changeset may be part of a development cycle for a CICD pipeline executed for the software product. Execution of the CICD pipeline can include testing the changeset with a prediction model based on feature data that characterizes a generation of the preliminary modification. The prediction model can provide an activation recommendation for the preliminary modification based on a plurality of risk factors determined from the testing. The prediction model can be trained, continuously, with training data that includes a plurality of data artifacts resulting from code build processes.

Figure 2A:
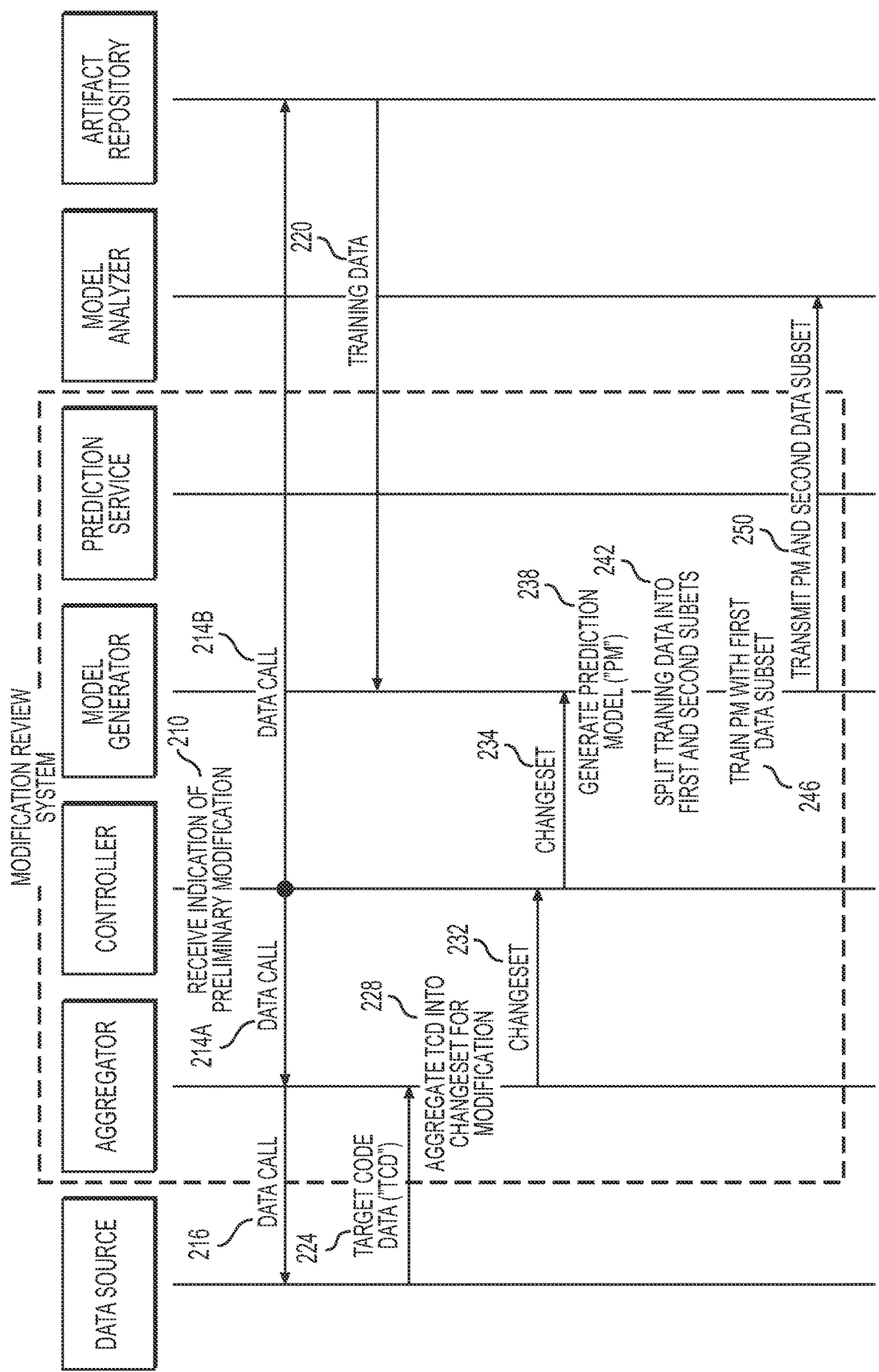
FIG. 2A is a sequence diagram of an example method for generating a prediction model for reviewing a changeset and generating review recommendations.
Figure 2B:
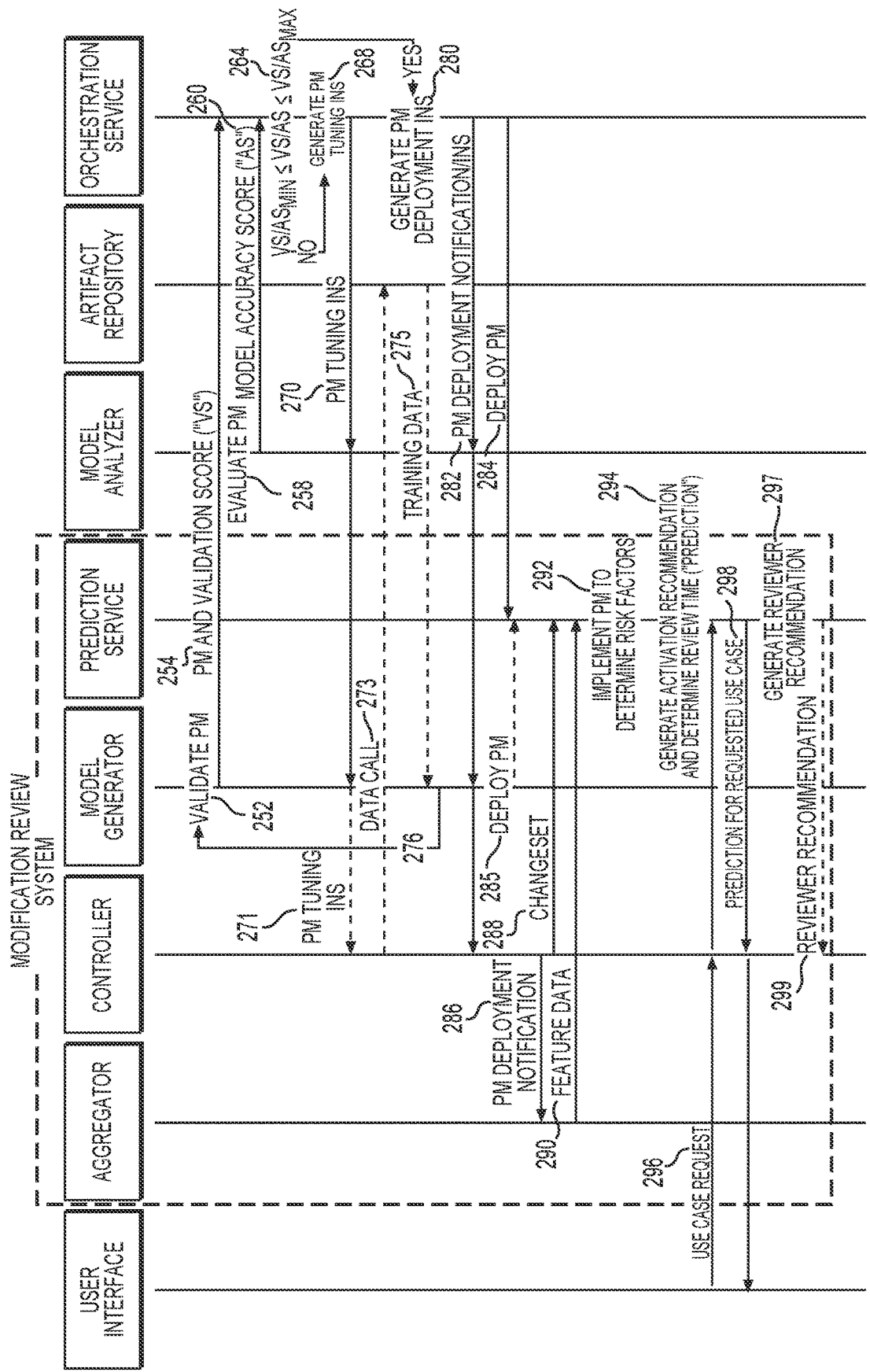
FIG. 2B is a sequence diagram of an example method for determining risk factors and generating recommendations for further changeset review.

FIG. 1 is a flowchart of an example method for implementing a review process for evaluating changes to target code (a changeset) to be implemented as part of a preliminary modification for a software-based product. FIG. 2A provides a detailed sequence diagram for an aspect of the method of FIG. 1 directed toward generating a prediction model that reviews a changeset and generates recommendations for further changeset review. FIG. 2B provides a detailed sequence diagram for an aspect of the method of FIG. 1 directed toward determining risk factors associated with a changeset and generating recommendations for further changeset review. The recommendations can include an activation recommendation, which represents an initial overall evaluation of a changeset, and whether or not the preliminary modification should be merged with the software product (otherwise referred to as a full implementation of the preliminary modification) is recommended. In one example, the recommendations can include a recommendation for an individual that will review the changeset. In another example, the recommendations can include an estimate of, or recommendation for, an amount time needed for review as part of a secondary analysis.

Figure 4:
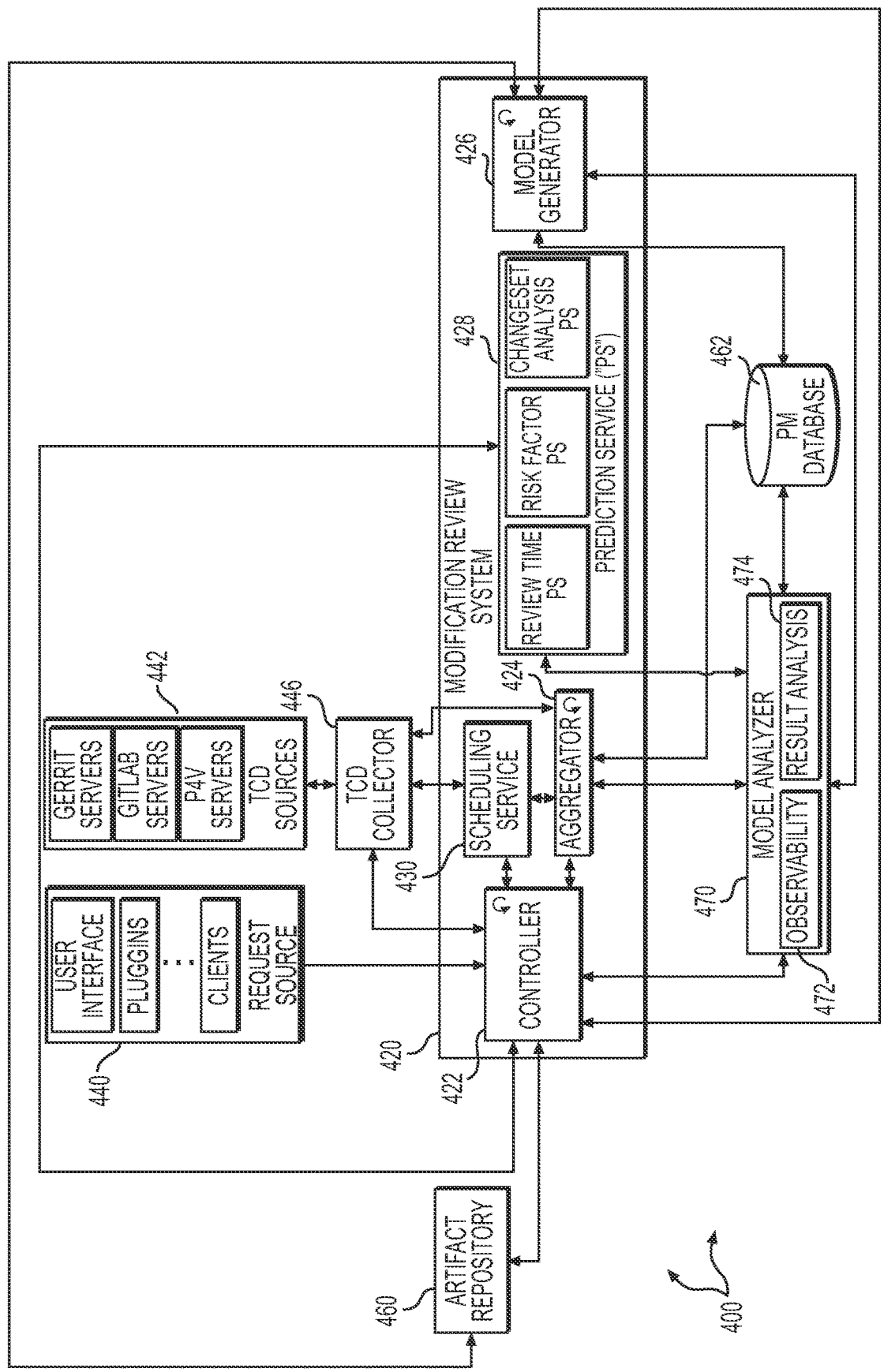
FIG. 4 illustrates a schematic representing exemplary system components and communications between system components for implementing a review process for evaluating changes to target code for a software-based product.
Figure 5:
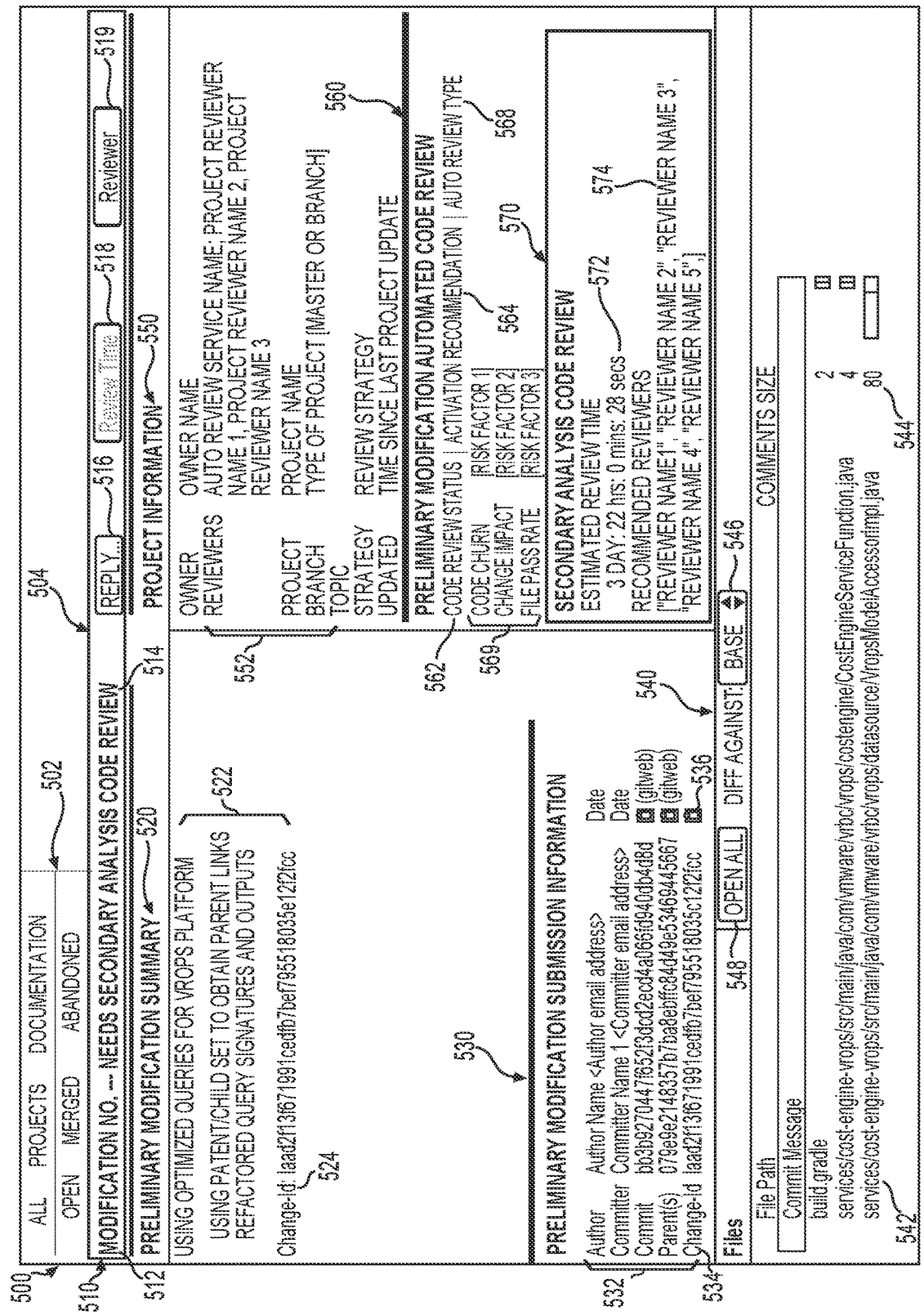
FIG. 5 is an illustration of an example graphical user interface ("GUI") of a dashboard used to perform and monitor various methods described herein.

FIG. 4 illustrates a schematic representing exemplary system components and communications between system components for implementing representing exemplary system components and communications between system components for implementing the methods described herein. In particular, FIG. 4 can represent system components that respectively communicate as components of an enterprise computing infrastructure that generates and continuously trains prediction models for evaluating changesets to code of software products used internally, or sold externally by the enterprise. FIG. 5 is an illustration of an example GUI of a dashboard used to perform and monitor various methods described herein. In particular, the GUI of FIG. 5 provides a dashboard that can be used to monitor stages of a changeset review process, and communicate with and direct other actors in the review process.

FIG. 1 is an example method with stages performed by a computing system architecture that may include one or more servers that may be connected through a network and implement or maintain: a backend; one or more user interfaces; one or more databases; and a plurality of computing services.

At stage 110, code that implements a software product ("target code"), and data related to the target code, (together referred to as "target code data" or "TCD") can be aggregated into a package ("aggregated data") by an aggregator.

In one example, the aggregator can obtain the target code data from a central data stream that includes an extraction layer which collects and saves data from different data sources into a relational database, such as a NoSQL database. In one example, the central data stream may be provided by a computing service that can collect data from other code data streams, as well as code review services, such as GERRIT, for example. In another example, the central data stream may include a query service that executes an API to retrieve data stored in the relational database with various query filters.

The central data stream can collect data related to: CICD pipeline execution; overall changeset pass or fail results that get triggered for each code review; and the code data stream pipeline stages, tasks, and execution results. For every code review collected by a central data stream that is in communication with an aggregator, the central data stream can collect feature data related to the target code. In one example, feature data can include: a project name; a branch status of the subject project—whether the target code for review is part of the master or a branch version of the software product; a merge status; insertions in a latest patch set; deletions in a latest patch set; modifications in a latest patch set; a code review approver; a list of all reviewers; files modified in a latest revision; number of files changed across a review; number of files commented on; number of review comments; number of unanswered review comments; line review coverage; file review coverage; reviewer activeness; comments effectiveness; and other metrics.

The aggregator can collect and aggregate the data from the central data stream into a package of aggregated data. In one example, the aggregated data can be transmitted to a machine learning model as part of a prediction model training process discussed in more detail with respect to stage 130.

At stage 120, the aggregator can obtain a changeset from the aggregated data in response to receiving an indication of a preliminary modification being made to the target code. In one example, the indication of the preliminary modification can be an internally recognized event resulting from an analysis by the aggregator of the most recently obtained data related to the target code. In another example, the aggregator may receive a notification from a controller that a preliminary modification has been made. The controller may monitor a CICD pipeline execution, and either detect or serve as a gatekeeper when target code that has been modified is checked.

In one example, the aggregator can implement one or more aggregation modules based on the requirements of a plurality of use cases than may include but are not limited to a review time prediction, individual risk factor prediction, and overall risk factor prediction (also referred to as a changeset analysis). The aggregator may include and maintain a respective data storage that is used to store the aggregated data. For each instance of data collection and aggregation by the aggregator, a call can be made to central data stream requesting data related to the target code. In one example, the aggregator can collect all the data for each data type required to determine if a changeset is present for a subsequent data collection and aggregation run. The aggregator can call the central data stream on a scheduled interval to collect the latest target code data based on a last synch timestamp and perform a delta aggregation. Results of the delta aggregation can reveal changes to the target code that constitute a changeset for a preliminary modification.

At stage 130, a prediction model that is configured to test a changeset for target code can be trained with data obtained from a repository, such as a JFROG ARTIFACTORY. The training data can include a plurality of data artifacts corresponding to results from a plurality of code build processes associated with the target code. In one example, the data artifacts can include previous prediction models. In one example, the training can include building and validating a prediction model. This can be based on a determination by a controller that a prediction model has not been generated or an existing model cannot be updated. In another example, training can include running a training session using data artifacts from the repository not available in a previous training iteration. In yet another example, training can include a controller receiving a confirmation from the repository that the data artifacts used in a previous training session are the most up to date and a new training session is not needed.

As described herein, a prediction model refers to a model artifact that is created from a training process. An algorithm implemented by a prediction model for a requested use case can determine a pattern in the training data, map input data to a target (review time, risk factors, overall risk factor) of the selected use case, and provide a machine learning model output that captures the patterns. In one example, data artifacts designated as training data for the prediction model may be split into first and second data subsets. More specifically, in one example, a first data subset can be utilized for training the prediction model, and a second data subset can be utilized to determine model accuracy for evaluating the prediction model. The training process can be continuous until a combination of test data validation and model accuracy scores best fit an algorithm used to train a prediction model.

A training process of stage 130 can involve the implementation of one or more machine learning algorithms. Example algorithms can include a decision tree regression algorithm, a linear regression algorithm, a random forest regression algorithm, or the like. The machine learning algorithm(s) may be utilized to train and measure an accuracy of the prediction model. In one example, training the prediction model can include analyzing separate implementations of the prediction model that each utilize a respective algorithm, and are each given an model accuracy score. This analysis can result in a particular algorithm being selected for particular use case (review time, individual risk factor, overall risk factor, or a combination) requested. In one example, a measure of prediction accuracy relative to a requested use case may be used to select a particular algorithm that is most appropriate.

Once a prediction model is evaluated as satisfactory to predict values from feature data of a selected use-case, the prediction model can be deployed by a modification review system to predict values for review time, individual risk factors, an overall risk factor, or a combination of these use-cases. In one example, a training process may be orchestrated by one or more services or an automation tool with plugins built for continuous integration, such as JENKINS JOB. In another example, deployment of the prediction model can include the prediction model being packaged as a service in a container to a registry, such as an JFROG ARTIFACTORY hosted DOCKER, and the container may be deployed as a prediction service for a modification review system.

In one example, both training data and data related to target code may undergo multiple stages of data processing to normalize each data set (removing null value record and handling missing values using data transformation through mathematic operations).

At stage 140, a changeset can be tested with the prediction model based on feature data that characterizes a generation of the preliminary modification corresponding to the changeset. This includes data aggregated in stage 120. In one example, the changeset is tested to determine the values of certain risk factors that correlate to a probability of software defects for operational failures. For example, the changeset can be tested to determine an amount of code churn that will occur as a result of: (A) a merge process in which a preliminary modification is fully implemented within a software project or branch of a project; and (B) an operation of the software product after the preliminary modification is merged. This includes data aggregated in stage 120. In one example, the aggregated data can pertain to certain data categories according to a particular use case that has been requested. For example, where a requested use case is for review time, the prediction model can be provided with a project and a branch a changeset belongs to; a total number of files modified for the changeset; a total number of different patch sets uploaded to the changeset; a total number of lines added and deleted for the changeset; a total number of review comments submitted for the changeset; and a list of potential reviewers.

At stage 150, the prediction model can generate an activation recommendation based on a plurality of risk factors determined from the testing in stage 140. In one example, the activation recommendation can represent an initial overall evaluation of a changeset, and whether or not implementation is recommended. More specifically, the activation recommendation represents the core output of an automated code review analysis carried out by a prediction service. In one example, the prediction service implements a prediction model that employs one or more machine learning algorithms. In turn, the algorithms may be run to determine individual and overall risk factor values to respectively associate with different categories (or combinations of different categories) of feature data and a changeset as a whole.

In one example, the activation recommendation can be determined based on the values of several risk factors returned by running aggregated data for the changeset through a prediction model of the prediction service. For example, the prediction model may determine each, a combination, or at least one of a number of files changed, a number of lines of code changed, a number of patches uploaded for a changeset falls within a range that corresponds to a high risk of failure, a file success rate, an owner success rate, and a review success rate. This determination can be a result of an implementation of a machine learning algorithm that takes the values for feature data, such as the those noted above, as input.

Taking a number of files changed as a specific but non-limiting example, the value for the number of files changed can be input into the machine learning algorithm of a prediction model. Running equations, considering prescribed limit values, and other types of data processing that are part of the automated implementation of the algorithm, all of which may be specific to the category of feature data represented by a number of files changed, an output may be produced. This output may be recognized by the prediction model as a score value for an individual risk factor associated with a number of files changed. The prediction model may include or recognize a set of score ranges that it compares to the algorithm output (score value) for the files changed risk factor. Depending on which range the output values falls into, a risk associated with the score value, and thus the number of lines of code changed for the changeset, may be determined to be high, medium, or low in one example.

In another example, the prediction model may determine a score value for the files changed risk factor, or any other individual risk factor that may be associated with a particular category or combination of categories of feature data, on a percentage scale. The scale can reflect a degree of risk determined by the prediction model. In this example, a risk factor score value of 100% can be the highest degree of risk that can be attributed to a value for a particular feature data category corresponding to an individual risk factor. On the opposite end, a risk factor score value of 0% connotes a lowest degree of risk.

Referring back to the example including the number of files changed, number of lines of code changed, and number of uploaded patches for a changeset, the prediction model may use a combination of risk factor score range associations or values to determine a YES or NO result for an activation recommendation. For example, risk factors 1, 2, and 3 are respectively associated with the feature data categories above. Where risk factor range associations for the scores for risk factors 1, 2, and 3 are respectively high risk, medium risk, and high risk, or possibly even low risk, medium, and high risk, the prediction model may determine that activation is not recommend. In another example using risk factor score percentages, where risk factor scores 1, 2, and 3 are 75%, 25%, and 80%, the prediction model may also output a "NO" value for the activation recommendation. In another example, the range associations or score percentages can be input for another machine learning algorithm that the prediction model implements exclusively for obtaining an activation recommendation output (YES or NO value). FIG. 2A is an example sequence diagram for generating a prediction model that reviews a changeset and generates recommendations for further changeset review.

Stages 210 to 224 include a series of data calls and responses. In particular, at stage 210, a controller receives an indication that a preliminary modification to target code has been made, submitted, or checked in. The controller can issue data calls to an aggregator and an artifact repository at stages 214A and 214B, respectively. In addition, at stage 216, the aggregator can forward some or all of the data call to a data source. The data source can be a central data stream that receives data related to target code for a software product from other data streams and code review services. At stage 220, in response to the data call in stage 214B, the artifact repository can transmit training data to a model generator. Stage 224 may be executed before, simultaneously, or after stage 220, and can include the data source transmitting target code data to the aggregator.

At stage 228, the aggregator can process and aggregate the target code data to identify and isolate a changeset. In one example, this can include the aggregator determining one or more of a file score, a reviewer score, and an owner score. The file score is defined as a number of changesets passed divided by a number of times a file was involved in any changeset for an entirety of the CICD pipeline execution ("changesets passed"). The reviewer score is defined as a number of times a reviewer was involved in any changeset divided by the changesets passed. The owner score is defined as a number of times an owner submitted any changeset divided by the changesets passed.

In stages 232 and 234, prior to transmitting the changeset to the model generator, the changeset can be transmitted to the controller and the model generator respectively. In one example, the controller can register aspects of the changeset, and add data such as a timestamp.

At stage 238, the model generator, which has been provided with the training data and the changeset, can generate a prediction model. Once the prediction model is generated in stage 238, the model generator can divide the training data into first and second data subsets in stage 242. In one example, a first data subset may comprise 60-80% of the training data obtained in stage 220. Accordingly, the second data subset may comprise a remaining 40-20% of the training data. In one example, the second subset of data can be utilized to evaluate the accuracy for the prediction model.

Stage 246 can include the model generator using the first data subset to train the prediction model. In one example, the changeset may be included with the first data subset and used for training the predication model. At stage 250, the model generator can transmit the prediction model and the second data subset to a model analyzer.

FIG. 2B an example sequence diagram for determining risk factors associated with a changeset and generating recommendations for further changeset review.

At stage 252, the model generator can validate test data from the generation of the prediction model. In one example, the model generator may implement one or more machine learning algorithms, such as decision tree regression, linear regression, and random forest regression algorithms, to train the prediction model and measure model accuracy. At stage 254, the model generator transmits the prediction model and a validation score ("VS") to an orchestration service. In one example, the prediction model is packaged a model in its entirety that is embodied in a serialized file and executes by receiving and processing inputs and generating outputs. In another example the prediction model can be packaged as an image of a prediction service that can be implemented by the prediction service.

At stage 258, the model analyzer can evaluate accuracy of the prediction model using the second data subset. The model analyzer can generate a model accuracy score ("AS") that is transmitted to the orchestration service at stage 260.

At stage 264, the orchestration service can evaluate the AS and VS relative to target values for these scores prescribed for a particular machine learning algorithm used to train the prediction model. In one example, minimum and maximum values for each of the AS and VS can be provided to the orchestration service for comparison to the scores transmitted in stages 254 and 264. In one example, the maximum and minimum limit values for one or both of the AS and the VS can be set by an operator or administrator of the orchestration service. In another example, the limit values may be determined as part of a machine learning algorithm corresponding to an algorithm implemented by the prediction model. In another example, the machine learning algorithm can determine a particular algorithm for training the model or for determining the limit values. The machine learning algorithm can do so according to a use case that has been requested.

In the event that the orchestration service determines the score values do not fall within their respective limit values, a model tuning instruction can be generated in stage 268.

Following generation, the orchestration service can transmit the tuning instruction to the model generator in stage 270.

An optional series of stages 271, 273, and 275 for additional training data acquisition can be executed as a result of the model generator receiving the tuning instruction at stage 270. In one example, execution of the series, instead of being optional, can be conditioned on a check of an inventory of training data immediately accessible by the model generator. The model generator may determine that additional data artifacts, or more up to date data artifacts, are required for tuning the prediction model.

At stage 271, the tuning instruction can be transmitted by the model generator to the controller. Based on the tuning instruction, the controller can issue a data call to the artifact repository for additional training data in stage 273. In response to the data call from the controller, the artifact repository can transmit additional training data to the model generator in stage 275.

Regardless of whether additional training data is acquired through stages 271, 273 and 275, the model generator can validate the prediction model in stage 252, followed by the execution of stages 254 to at least stage 264, as part an operational loop 276. More specifically, as illustrated in FIG. 2B, each subsequent iteration of stage 252 can be immediately preceded, and thus triggered, by the model generator receiving at least the model tuning instruction. However, if the model generator transmits the tuning instruction with stage 271, the model generator will wait for additional training data before executing model validation process in stage 252.

As depicted in FIG. 2B, stages 254 through 276 execute until the VS and AS fall within the prescribed limit values that are fit to a particular machine learning algorithm for the prediction model at stage 264. As result of the algorithm being satisfied, the orchestration service generates a prediction model deployment instruction in stage 280.

At stage 282, the orchestration service can broadcast the deployment instruction as a notification or a directive to a model analyzer, the model generator, and the controller. In another example, the model analyzer can receive the deployment instruction and transmit it to the model generator, which can transmit the deployment instruction to the controller. Following the broadcast at stage 282, the orchestration service can deploy the prediction model with a prediction service at stage 284. In another example, the model generator, having been notified that the prediction model is ready for implementation by receiving the deployment instruction, can optionally deploy the prediction model in stage 285. It will be understood that the model generator can store generated models for a period of time, and therefore can be available for deployment activities as in optional stage 285.

Before, after, or while the prediction model is being deployed, the controller can issue a model deployment notification in stage 286 as a result of the controller receiving the deployment instruction at stage 282. At stage 288, which can be executed by the controller concurrently with stage 286, the controller can transmit the changeset, which was obtained in stage 232, to the prediction service.

At stage 290, the aggregator transmits feature data extracted from target code data to the prediction service. The feature data characterizes aspects of a coding process carried out to generate the preliminary modification, which is embodied by the changeset that is also fed to the prediction model. More specifically, feature data categories such as author, lines of code changed, number of patches uploaded, number of files changed, and others constitute data that reflects how a preliminary modification was created. The feature data is in turn processed by the prediction model to analyze and make predictions about the changeset.

Stage 292 includes the prediction service implementing the prediction model and determining risk factors for the changeset (preliminary modification). The risk factors determined in stage 292 may correspond to a particular use case that has been requested. In another example, the prediction service can determine all risk factors that can possibly be determined from the feature data received in stage 290.

At stage 294, the prediction model can generate an activation recommendation and determine an estimate for a review time for the changeset. In one example, the activation recommendation can represent an initial, pre-secondary-analysis by a reviewer, overall evaluation of a changeset, and whether or not implementation is recommended.

At stage 296 a use case request can be received by the controller from a user interface. In turn, the controller can transmit an instruction or a call to the prediction service for a value of a prediction corresponding to requested use case. Stage 298 includes the prediction service transmitting the prediction for the request use case to the controller, which it forwards to the user interface. In one example, the prediction transmitted can include one or more of the activation recommendation, the review time, and a list of reviewers to a user interface. In another example, the controller can receive and store a package of information including all of the above predictions, and then transmit the prediction corresponding to the requested use case to the user interface. The user interface can display the activation recommendation, review time, or the reviewer list in a GUI.

The prediction service can optionally analyze, or further analyze, reviewer performance data and generate a recommendation for a reviewer in stage 297. Following its generation, the reviewer recommendation can be transmitted by the prediction service to the user interface the controller in stage 299.

In one example, the feature data provided in stage 290 can depend on the use case requested through a user interface at stage 296 in an exemplary sequence where stage 296 occurs before stage 290. For example, where only a review time is requested, the feature data provided to by the aggregator can include feature data of the changeset for the categories provided in Table 1 below.

TABLE 1

| Changeset Feature Data Utilized to Predict Review Time |
| --- |
| Project and branch changeset belongs to |
| Total number of files modified for the changeset |
| Total number of different patch sets uploaded to the changeset. |
| Total number of lines added and deleted for the changeset. |
| Total number of review comments submitted for the changeset. |
| List of Potential Reviewers |

On the other hand, where a changeset analysis is requested, feature data of the changeset for the categories provided in Table 2 may be provided to the prediction service.

TABLE 2

Changeset Feature Data
Utilized to Predict Risk Factors

GERRIT host changeset belongs
Project and branch changeset belong to
Unique Id of changeset
Time taken for automated review
Number of lines of code ("LOC") inserted
and deleted in latest patch set
Number of review comments for changeset
Total LOC inserted and deleted across all
the patch sets belonging to the changeset
Total number of files modified
Total number of different patch sets
uploaded to the given changeset
List of potential reviewers
Owner success rate
File success rate
Reviewer success rate
CICD pipeline execution status (pass or
rail for that changeset)

In another example, the aggregator can identify data corresponding to the categories listed in Tables 1 or 2, from the data obtained from a data stream.

Figure 3:
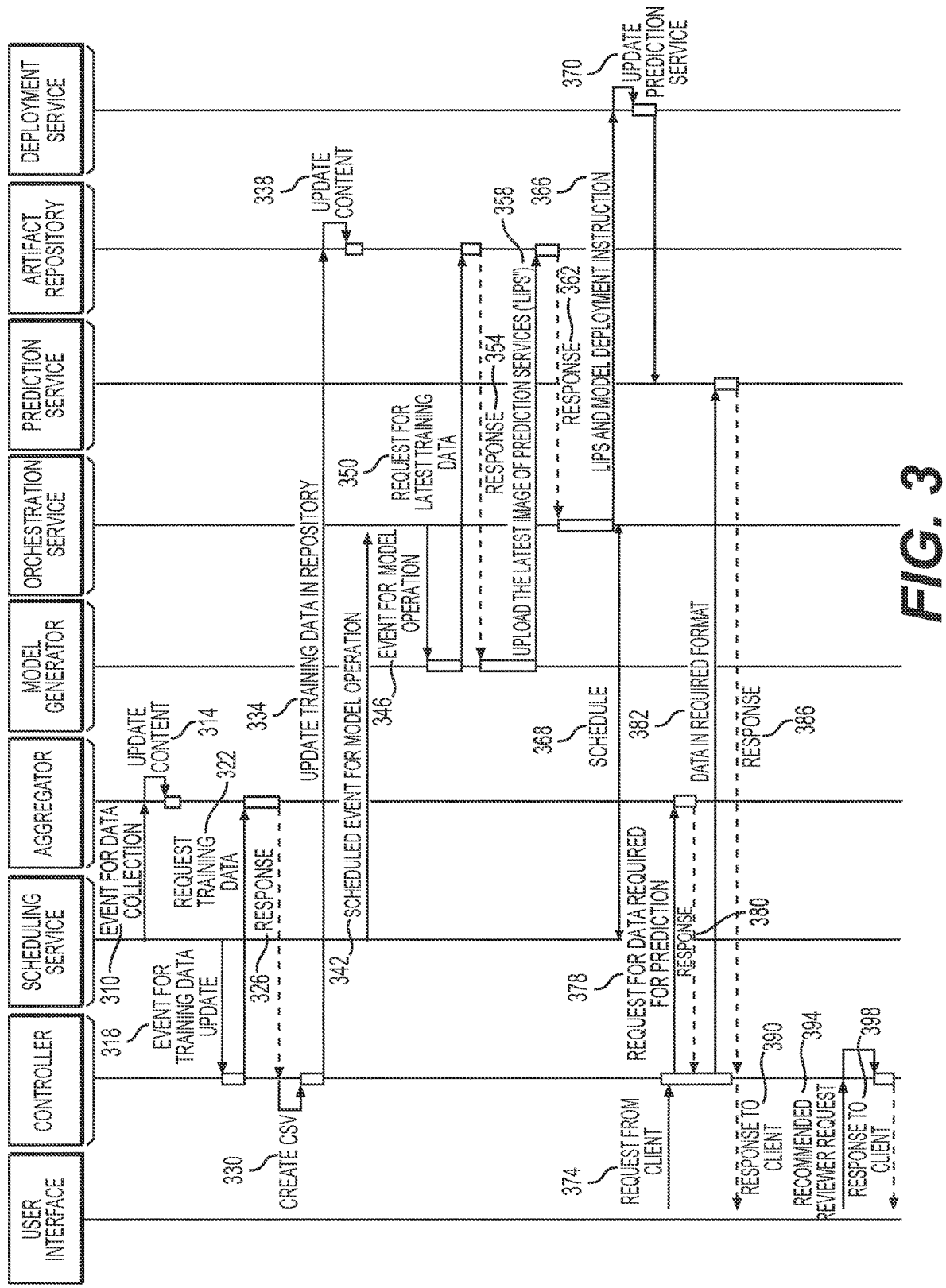
FIG. 3 is a sequence diagram of an example method for implementing machine learning to continuously train a prediction model for determining changeset risk factors.

FIG. 3 is an example sequence diagram for implementing machine learning to continuously train a prediction model for determining changeset risk factors.

At stage 310, a scheduling service can generate an event or notify an aggregator of an event for collecting data. A frequency of events scheduled by a scheduling service can be established by an operator in an administrative capacity with respect to a modification review system. In another example, the machine learning model may be implemented to determine a cyclical or non-cyclical schedule of events.

At stage 314, the aggregator can update stored content by communicating with one or more data sources (not shown). As discussed above, a data source may include a central data stream that obtains data from one or more code streams, as well as code review services such as GERRIT.

Stage 318 may be carried out during or after stages 310 and 314 are executed. The scheduling service in stage 318 can issue an instruction or notification of an event for updating training data to a controller. A schedule for updating the training data may be the same as, or different from, a schedule of events for data collection by the aggregator. As a result of receiving the communication from the scheduling service, the controller will issue a request for training data from the aggregator in stage 322. The aggregator can respond in stage 326 with: a status of the prediction model; any target code data it possesses; and any feature data previously collected and aggregated.

Stage 330 includes the controller processing the response from the aggregator to create a comma separated value ("CSV") file that the controller first stores in a respective memory. At stage 334, the controller issues an instruction to the artifact repository to update the training data stored by the artifact repository. In response, the artifact repository updates its respective content in stage 338.

In stage 342, the scheduling service can issue a notification, instruction, or event description to an orchestration service. The instruction from the scheduling service can include a machine learning model operation to be performed by a model generator. In one example, the operation can be to generate a new prediction model. In another example, the operation can be an instruction to update the prediction model with new training data. In another example, the operation can be an instruction to tune an existing prediction model according to a new set of limit values for the AS and VS scores.

At stage 346, the orchestration service can transmit the event for the model operation to the model generator. In one example, the orchestration service can delay stage 346. This may be part of the orchestration service determining a current schedule of event needs to be changed. At stage 350, the model generator can request the latest training data from the artifact repository in response to the orchestration service transmitting the model operation event in stage 346. In another example, the model operation event in stage 346 could be coupled with an instruction from the orchestration service to delay requesting the latest training data for a predetermined period of time. In another example, the model operation event transmitted in stage 346 can specify a volume of data needed by the model generator from the artifact repository.

At stage 354, the artifact repository transmits training data to the model generator in a response to the request of stage 350. In one example, where a volume of data is specified to the model generator in stage 346, the model generator can transmit the volume requirement to the artifact repository in stage 350. As a result, stage 354 can be delayed until the artifact repository has packaged a required volume of data. The model generator can utilize the updated training data to either generate or update a prediction model.

At the completion of a model being generated or updated, in stage 358 the model generator can upload a latest image of a prediction service ("LIPS") to the artifact repository for storage. Thus, the LIPS can become an artifact for use in future model training instances. In addition, the artifact repository transmits the LIPS to the orchestration service in stage 362. This serves as a notification to the orchestration service that a new prediction model or model update is ready for deployment.

The orchestration service can store the LIPS permanently or temporarily. At stage 366, the orchestration service can send the LIPS and a deployment instruction to a deployment service. The deployment service can be container-orchestration system, such as KUBERNETES, that automates application deployment, scaling, and management. In one example, the deployment service may utilize a container tool, such as DOCKER, and constituted a cloud-based platform.

In one example, a schedule for issuing data collection and training data update events can be generated independently of any generations of preliminary modifications. More specifically, stages 310 to 370 define a first series of stages that can be performed on a continuous basis. The scheduling service can continuously notify the orchestration service of a current schedule for events at stage 368. For example, once stage 366 is completed, the orchestration service can obtain a schedule for a next implementation of stages 310 and 318 from the scheduling service. In response, the orchestration service can instruct the scheduling service to change or leave unchanged a current schedule.

In one example, the orchestration service can provide the LIPS and the deployment instruction to the controller in stage 368, along with a new schedule. This may occur instead of stage 366, with the controller eventually transmitting the LIPS and the deployment instruction according to a schedule communicated by the orchestration service. At stage 370, the prediction service can be updated with a deployment of the LIPS with the prediction service, by the deployment service, according to the deployment instruction. In one example, stage 370 is executed independently of which method is employed by the deployment service to obtain the LIPS and the instruction.

At stage 374, the controller can receive a use case request. The request can be submitted, in one example, by a client through a user interface that is in communication with the controller. In turn, at stage 378, the controller can issue a request to the aggregator for data required to provide the prediction corresponding to the use case requested. At stage 380, the aggregator can respond with the requested data, which the controller provides to the model generator in stage 382.

At stage 382, the controller formats the data from the aggregator and transmits it to the prediction service. In response to receiving the data from the controller, the prediction service implements the model with the formatted data to produce a prediction for the use case requested in stage 374.

Stage 386 includes the prediction service sending the prediction to the controller. The controller can display the prediction on the user interface at stage 390. The user interface may include a GUI with a dashboard that includes options for inputting data and requesting for additional information.

In one example, the user interface can send the controller a use case request for a recommended reviewer for a secondary analysis at stage 394. In response, the controller can select one reviewer from the list of reviewers provided in stage 398. In one example, the recommendation can be based on reviewer performance and take into account review availability.

In one example, the request received by the user interface at stage 374 can be converted into an API request that the controller provides an API response to. Examples of API requests and responses that effectively carry out stages 374 to 390 are provided in Tables 3 and 4 below. In particular, Table 3 provides an example of an API request and response for a review time use case request.

TABLE 3

API REQUEST AND RESPONSE FOR REVIEW TIME USE CASE REQUEST

| | |
|---|---|
| [01] | GET: http://<MODREVIEW HOSTNAME>:<PORT>/modreview/reviewtime? project=<PROJECT-NAME>&branch=<BRANCH>&changeid=<CHANGESET-ID> |
| [02] | Response: (In Seconds) 299524.17647058825 |
| [03] | POST: http://<REVIEWTIME-PREDICTION-SERVICEHOSTNAME>:<port>/predict |
| [04] | Request: |
| [05] | { |
| [06] | "allReviewersList": "reviewer1, reviewer2, reviewer3", |
| [07] | "project": "project-ten", |
| [08] | "branch": "master", |
| [09] | "numberOfFilesChanged": "29", |
| [10] | "numberOfPatchSets": "6", |
| [11] | "numberOfReviewComments": "0", |
| [12] | "insertionsInLatestPatchset": "237", |
| [13] | "deletionsInLatestPatchset": "227" |
| [14] | } |
| [15] | Response: (In Seconds) |
| [16] | 299524.17647058825 |

Table 3 includes line numbers for reference to specific elements of the API request and response detailed therein. In particular, Line [01] includes the API call that may be provided from a user interface to a controller, as a result of input to the user interface from a client. In this example, the API call specifies a service being called ("MODREVIEW"), a use case requested ("/reviewtime?"), and identifies elements of a changeset for which a use case is being requested ("PROJECT-NAME," "BRANCH," and "CHANGESET-ID"). Line [03] provides an example of a call that may be posted by a controller to an aggregator and a prediction service as result of the API request in line [01]. As shown, the post can specify the use case being requested ("REVIEWTIME-PREDICTION").

Lines [04] to [13] include feature data that is required by, and provided to, the prediction service in order for the prediction service to predict a review time for the changeset. The data types listed in lines [06] to [13] can correspond to the data types in Table 1, provided above. Line [15] provides an API response that includes a review time determined by the prediction service based on the values included in lines [06] to [13] returned for each respective feature data type. The review time value in line [15] may be displayed on the user interface or otherwise provided to a client that submitted the use case request.

Table 4 provides an example of an API request and response for a changeset analysis.

TABLE 4

API REQUEST AND RESPONSE FOR CHANGESET ANALYSIS
(OVERALL RISK FACTOR AND ACTIVATION RECOMMENDATION)
USE CASE REQUEST

```
[01]  GET: http://<MODREVIEW-HOSTNAME>:<PORT>/analyzer/
      predicti<PRODUCT>/<BRANCH> /changeset /<CHANGESET-ID>
[02]  Response:
[03]  {
[04]     "tokenActivationRecomrneded ": "Token activation not recommended",
[05]     "change Churn": "HIGH"
[06]     "changeImpact": "LOW",
[07]     "passRateFactors": {
[08]        "fileParameterValueLowPassrate": false,
[09]        "userParameterValueLowPassrate": true,
[10]        "reviewerParameterValueLowPassrate": true
[11]     },
[12]     "relevanceFactors": {
[13]        "fileParameterValueLowRelevance": true,
[14]        "userParameterValueLowRelevance": true,
[15]        "reviewerParameterValueRelevance": true
[16]     },
[17]     "change    id":    "I602352d802299lf3baaaa94998led566fbb69f3a    ",
[18]     "tokenActivationRecomrnendationReason" : [ {
[19]        "type": "BAD",
[20]        "message": "High code churn (no. of lines inserted and deleted)"
[21]     }, {
[22]        "type ": "BAD",
[23]        "message": "Sub optimal review efficiency (time spent on review for
[24]        quantum of code)"
[25]     }, {
[26]        "type": "GOOD"
[27]        "message": "Low impact (no. of files modified)"
[28]     }, {
[29]        " type ": "GOOD",
[30]        "message": "Files involved in change have high success rate in
[31]        pipeline."
[32]     }, {
[33]        " type ": " BAD",
[34]        "message": "Change owner has low checkin success rate."
[35]     }, {
[36]        " type ": " BAD",
[37]        "message": "Reviewers have low success rate in pipeline for past
[38]        reviews."
[39]     },
[40]     ],
[41]     "reviewEfficiency": "SUB-OPTIMAL",
[42]     "reviewEffectiveness": "INADEQUATE",
[43]     "releveant": false
[44]  }
```

As shown in Table 4, line [01] includes an API request that specifies a use case requested ("/analyzer/predict/"), identifying elements of changeset for which a use case is being requested ("PROJECT-NAME," "BRANCH," and "CHANGESET-ID"). A post statement and feature data request is not included in Table 4 for the purposes of brevity. However, in one example, a post similar to the post provided in line [03] of Table 3 may be executed, and the feature data requested may correspond to the feature data categories provided above in Table 2.

Lines [04] to [16] in Table 4 can be considered as equivalent to line [15] in Table 5. More specifically, an API response for changeset analysis use request may return to a client, an activation recommendation (line [04]) and information with regards to individual risk factors. For example, an indication of whether a code churn for a preliminary modification is high or low (line [05]), as well as an indication of whether an impact (e.g., number of files modified by a preliminary modification) to a project or branch is high or low (line [06]), can be returned in the API response. The API response can also provide information regarding other risk factors, such as whether certain pass rate and relevance values for certain elements (file), sub-elements (format of file), and actors (user, reviewer) associated with the changeset are high or low (lines 07]-[15]). In another example, the API response can specify which risk factors, such as code churn, review efficiency, impact, or reviewer success rate, had the greatest influence on, and provides a reason for, whether or not activation of the changeset is or is not recommend (see lines [20], [234], [27], [30], [33], [36]). Although stages 310 to 370 define a first series and stages 374 to 398 define a second series, the components of FIG. 3 are not limited to performing the stages that make up these series in subsequences as shown. Rather, stages from the second series may occur before and after the first and last stages of the first series. For example, stage 322 may be executed in response to a use case request from a client as in stage 374.

FIG. 4 illustrates a schematic representing exemplary system components 400 and communications between the system components 400. The system can implement a review process for evaluating changes to target code of a software-based product.

In one example, a modification review system 420 for the system 400 includes a controller 422, a data aggregator 424 ("aggregator 424"), a model generator 426, a prediction service 428, and a scheduling service 430. The modification review system 420 can cause an automated review of a preliminary modification, or provide use case results, such as a review time, recommended review, or risk factor. These features can be initiated in response to the controller 422 receiving input from a request source 440.

In one example, the request source 440 can include multiple clients, plugins, or user interfaces that can generate and send a request for review information regarding a preliminary, merged, or abandoned modification. Merged and abandoned modifications are described in more detail with reference to a menu section 504 illustrated in FIG. 5. In another example, the request source 440 can include a user interface that has access to the target code. An input device can be utilized by a user, such as an operator, administrator, or an employee, to work on the target code of the software-based product through the user interface. Accordingly, when a preliminary modification is actually created and submitted for review, the initial submission of the preliminary modification can serve as an event that causes the controller 422 to initiate a changeset analysis.

The controller 422 provides communication management and data formatting services. In one example, the controller 422 provides an entry point for the modification review system 420. The controller 422 can operate as an agent that facilitates communication between various components, as well as communication between a user and components of the modification review system 420. In one example, the controller 422 provides as the entry point by which all clients obtain prediction service results for different changeset analysis use cases. In one example, a client may include a GERRIT plugin or certain enterprise-implemented user interfaces such as P4V by Perforce®.

The controller 422 can function as a mediator between different components of the modification review service 420 such as the prediction service 428 and model generator 426. For example, where a user or external system requests a review time prediction from the modification review system 402, the controller 422 may coordinate with the predictive service 428 to get a value for the review time prediction. The controller 422 can then return the value to the client. In another example, the controller 422 can manipulate and format different types of data. For example, the controller 422 may format data provided from a component of the modification review system 420, so that the data can be processed by review system component, such as the model generator 426. In another example, the controller may format data provided from system review component so that the reformatted data can be processed by another one of the system components 400, such as an artifact repository 460. In another example, the controller 422 can modify or format training data from any source.

The aggregator 424 can collect and aggregate data related to target code. The aggregator may include several different modules or sub-services that cause different data types or data sets to be aggregated according to the requirements for a use case that has been requested. Examples of use cases can include a review time, a recommended review, or a value for a particular risk factor, such as code churn. In one example, in combination with training data from an artifact repository 460, the aggregate data from the aggregator 424 can be used by a model generator 426 to train a prediction model.

The aggregator 424 can maintain an internal data persistence to store the aggregated data. Data can be stored from an initial call (or a previous call) for data from a TCD collector 446. This stored data can be used by the aggregator 424 to perform a delta aggregation with data received for subsequent calls to the TCD collector 446. Thus, the aggregator 424 utilizes a storage capability to identify a changeset for a preliminary modification. In one example, the aggregator 424 can call for data from the TCD collector 446 on a scheduled interval to collect the latest data based on a last sync timestamp, and then perform the delta aggregation.

The aggregator 424 can obtain the target code data from the TCD collector 446. The TCD data collector 446 may be embodied by a central data stream that includes an extraction layer which collects and saves data from different data sources into a relational database. In one example, the TCD data collector 446 may be provided by a computing service that can collect data from the TCD sources 442. In another example, the central data stream may include a query service that executes an API to retrieve data stored in the relational database with various query filters.

In one example, the TCD collector 446 may receive data from multiple servers or multiple groups of servers illustrated in FIG. 4 as TCD sources 442. The TCD sources 442 provide data that is processed by the aggregator 424 after passing through the TCD collector 446. The TCD sources 442 provide data that is eventually used by, and in some cases used to develop, a prediction model that evaluates preliminary modifications. Servers making up the TCD sources 442 can be associated with a respective development tool, and provide or have access to a repository of data utilized by that tool. In one example, the TCD sources 442 may include GERRIT servers, as well as servers for file version-control platforms such, as GITLAB or Perforce®. Such version-control platforms may be configured to track changes in source code, or manage source files and other documents, such as revisions to web pages and operating system administration files. In addition, the TCD sources 442 can also include code data streams, for example.

In one example, the model generator 426 is configured to obtain data from the artifact repository 460, execute one or more machine learning processes, and communicate with a model analyzer 470. The model analyzer 470 can evaluate multiple predication models that implement machine learning algorithms for accuracy. As described herein, a prediction model that implements a machine learning algorithm can include a model artifact created from a training process implemented by the model generator 426. As part of an implementation of a machine learning algorithm, the model generator 426 can find a pattern in training data, map input data for a use case requested for prediction, and provide a prediction model output that captures these patterns.

The model analyzer 470 may be provided by a metrics and analytics service. The model analyzer can be configured to test prediction models to determine values for key performance indicators ("KPI") that are used measure model accuracy. In one example, the model analyzer may be provided by a metrics cloud monitoring and analytics platform. In one example, the model analyzer 470 may implement an observability service 472 and a result analysis service 474.

Once the generation of a new prediction model is completed, the model generator transmits a model score for data presented to the prediction model to the model analyzer 470 and a prediction model ("PM") database 462, in an example. The model analyzer 470 can receive data being held by the model generator 426 and receive a predicted model score during the training process. The model analyzer 470 can utilize the information received to determine a reason for a variation in input data, a trend of model score, a trend of a variance between actual vs predicted score values, and other metrics.

Once a prediction model has been evaluated by the model analyzer 470, and the model analyzer 470 has determined the prediction model is sufficiently accurate to predict the values from given features data, the prediction model may be deployed to predict the values. Based on the evaluation results and its accuracy as determined by the model analyzer, the prediction model may be packaged as a service in a container that may be deployed by the prediction service 428 for the modification review system 428. In one example, the generated model may be packaged as prediction model for a single use case, such as review time, an overall risk factor, or a particular risk factor.

In one example, the model generator 426 can be provided by a script that obtains the latest training data and creates machine learning artifacts required to formulate a prediction. The scheduling service 430 may periodically send a request or event to the model generator 426 that causes the model generator to get the latest training data from artifact repository 460. In one example, the model generator 426 can train data and generate machine learning-related artifacts, such as scaler objects, encoders, and the like, that can be used by the prediction service 428. Once artifacts are generated, a new docker image may be created for the prediction service 428, similar to the process preformed in stage 358 of the method of FIG. 3. When a model is generated, a model score may be recorded in the PM database 462, in an example.

In one example, a prediction model created by the model generator 426 can be deployed by or at a prediction service 428 as a web application service. In another example, an orchestration service that coordinates an ongoing prediction model updating process subsequent to model generation, can deploy the prediction model at the prediction service. In still another example, the prediction service 428 can implement different prediction service APIs for a given set of data types for features provided as inputs for a prediction model. In one example, the prediction model may be exported in a serialized file in a particular format suitable for an interpreted, high-level, general-purpose programing language, such as Python™. Further, the serialized file may be provided to an API for implementation that results in a changeset analysis according to a use cases that has been selected or derived based on data types of the feature data provided.

The scheduling service 430 can generate events or notify the aggregator 424 of an event for collecting data, and can send instructions that define a machine learning model operation that will be performed by the model generator 426. A frequency of events scheduled by the scheduling service 430 can be established by an operator or a machine learning algorithm may be implemented to determine a cyclical or non-cyclical schedule of events. Instructions provided to the model can be for certain operations such as generating a new prediction model, updating a prediction model with new training data, and tuning an existing prediction model according to a new set of limit values for variance between validation and accuracy scores.

FIG. 5 is an illustration of an example GUI 500 that can be used to monitor various aspects of the execution of the methods described herein.

More specifically, the GUI 500 can be used by a user or administrator to call up information on changes to a software product that have been submitted for review. The GUI 500 allows the user to pick a preliminary modification and find out if it been put through an automate review process, and if so, what were the results of that analysis. Thus, the user can find out if activation of the selected modification is recommended. In terms of a secondary analysis to be, or that has been, conducted by a reviewer. The GUI can display a predicted review time and a list of possible reviewers, and provide a platform to send messages to any of the reviewer. In a case where a secondary analysis has been conducted, the GUI 500 can reflect the results of the secondary analysis in with comments provided by a review, as well as information regarding an actual time spent on the review.

As illustrated, the GUI 500 includes a menu 502 and a dashboard module 504. The menu 502 includes options that can be selected to bring up list result pages, and used to filter the results listed. In one example, the "PROJECTS" option may be selected, and a list of projects and any modifications for each project may be displayed. A user can further select a modification status option of "OPEN," "MERGED," or "ABANDONED." Modifications with a status of "OPEN," in one example, are preliminary modifications that have not been fully implemented or merged with their respective projects. Modifications for which a review process has been completed can have a status of "MERGED" or "ABANDONED." Modifications with a "MERGED" status have been fully implemented and are no longer preliminary modifications. On the other hand, modifications with an "ABANDONED" status are also no longer preliminary modifications. Instead, "ABANDONED" can indicate that these modifications will not be fully implemented.

The dashboard module 504 is an example of a dashboard page that may be displayed after a selection of a preliminary modification from a list or one or more modifications displayed as selectable options for a project listed in a results page after selection from the menu 502. As illustrated, the dashboard module 504 can include a status bar 510, a summary section 520, a submission information section 530, a file section 540, a project information section 550, an automated review section 560, and a secondary review section 570. In one example, the selection of a preliminary modification from a results list page can serve as a request as in stage 374 or stage 394 of the sequence illustrated in FIG. 3. In another example, the dashboard module 504 could be displayed as a result of a user submitting a preliminary modification.

The status bar 510 can include a message header that lists a modification number 512 and status message 514 for a selected preliminary modification. The modification number 512 can correspond to a number of preliminary modifications that have been submitted for a respective project. Alternatively, the modification number can reflect a number of preliminary modifications for a respective branch of a project that the preliminary modification belongs to. The status message 514 can reflect what stage of the review process the preliminary modification is in. An example is illustrated in FIG. 5 for preliminary modification that as been tested with a prediction service, but is yet to go through a secondary analysis by a reviewer. In another example, the status message 514 may include other content that is provided by a reviewer that has been selected for, is in the process of completing, or has completed a secondary analysis.

The status bar 510 may also include several input buttons that an operator may select. As shown, a reply button 516 can be provided. An operator or an administrator can use this to send a message to a reviewer that been recommended for, is in the processing of completing, or has completed a secondary analysis. In one example, an administrator may use the reply button 516 to address (respond to) or change a status message 514. Other buttons provided in the status bar 510 can include a review time and reviewer request buttons 518, 519.

The review time request button 518 is illustrated as being greyed out in FIG. 5 to reflect that the button cannot be selected. In one example where a predicted review time has already been determined and displayed in the secondary review section 570, this button may not be selected again. In another example, even where a predicted reviewer has been determined, a user may select the review time button 516 so that a changeset for a preliminary modification is tested again. The review request button 519 may be selected by an administrator in order to obtain a recommendation for one of the reviewers in the list of recommended reviewers 574 in the secondary review section 570. In one example, an administrator may select the reviewer button 519 more than once, for example if a first recommended reviewer is unavailable to conduct a secondary analysis. In another example, a version of the GUI 500 can be generated that provides prediction values for an activation recommendation, review time, risk factors, and reviewers are read-only. In this example, request buttons 518, 519 are actually labels and the corresponding prediction values which The summary section 520 may include text content 522 that describes certain aspects of a preliminary modification. For example, the text content 522 may describe what features are to be added, modified, or repaired by the preliminary modification. The text content 522 may also include a change-ID 524, which may be a unique identifier assigned to the preliminary modification. In one example, the change-ID 524 is not the same as the modification number 510.

The submission information section 530 can include submission details 532 that inform of a history and a family for the preliminary modification. For example, the submission details 532 can include: who created the modification and date that occurred; who submitted the modification to be merged; and relationships with other modifications, such as parent and children relationships. A change-ID 534 can also be included in the submission details 532. In addition, some values for categories of the submission details 532 can be provided with selectable icons 536 that allow a user to access addition information. For example, selecting the icon 536 associated with the value for "Parent(s)" may cause a module to be displayed that shows parents and children for the preliminary modification. Such a module may include links that if selected cause a dashboard page to come up for the selected modification.

The file section 540 may include a table with column that lists files 542 that are modified by the preliminary modification. The table may also include a column that lists comment values 544 for each file. The comment values 544 can correspond to a number of comments made by an author, committer, reviewer, administrator, or the like with regard to a corresponding file from the first column. The file section 540 may also include a filter button 546 that can be selected to change the files listed, and an open button 548 that be selected to bring up one or more of the listed files.

The filter button 546 can include a dropdown box that allows a user to select from several options that correspond to reference points within the course of a CICD pipeline. Some examples for options provided in the dropdown box may include "BASE" or "LAST MODIFICATION." In the case of "BASE" option, the files listed will be files for the preliminary modification that are changed relative to a corresponding file for an initial release of the software product. Accordingly, some files 542 listed may not have been subject to any changes by the current preliminary modification, but include the changes made in modifications that were merged between the time of the preliminary modification and the initial release. In another example, selecting "LAST MODIFICATION" result in only the files that were changed as result of the preliminary modification being listed. In addition, a number of comments for any given file may be limited to just those comments made for a given file since the last modification, and not every comment since the instantiation of the file.

The project information section 550 provides project details 552 that can include a name of a project, a project owner, and a list of reviewers and review processes implemented. In addition, the project details 552 can include category that informs as to whether the preliminary modification is for a master of the project, or a branch. In addition, the project details can include a field for a date of a last modification for the project.

The automated review section 560 can provide a status and data determined through an implementation of the prediction service. In particular, the automated review section 560 and provide a code review status 562, an activation recommendation 564, name of values for a code review status 562, an activation recommendation produced 564, and a type of automated review 568 resulting the activation recommendation 564. In one example, the code review status can reflect that the automated review has not started, is in process, or has been completed. Only in the latter case may there be a value for the activation recommendation. In another example, the type of automated review 568 may correspond to a type of machine learning algorithm that has or will be implemented for the automated review.

In addition to the above status related elements, the automated review section 560 may display values for risk factors that have been determined for the automated review. In one example, these values may be displayed as they are determined. In another example, certain risk factors 569 may be displayed as they are determined, with values changing as the automated review is completed. For example, code churn may be displayed at all times and its value may increase as the automated review progresses.

The secondary review section 570 can include a review time 572 that a prediction service has determined may be required for a secondary analysis of the preliminary modification, and a list of potential reviewers 574. In one example, a different review time may be determined for each reviewer and displayed as a user selects or hovers over a name of one of the listed reviewers 574. In yet another example, the review time may represent a consolidated review time for a changeset and therefore provided as a field in the automated review section 560. In this example, a user may hover or select different reviewers in the secondary review section 570, but the value for review time, which is displayed in the automated review section 560, will remain the same for each reviewer.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for implementing a review process for evaluating changes to target code for a software-based product, the method comprising:
   aggregating data for the target code into aggregated data;
   obtaining a changeset from the aggregated data in response to receiving an indication of a preliminary modification being made to the target code;
   training a prediction model configured to test the changeset using training data obtained from a repository, the training data including a plurality of data artifacts corresponding to results from a respective plurality of code build processes;
   evaluating the prediction model by at least:
      dividing the training data into a first data subset and a second data subset, processing the first data subset to train the prediction model and determine a validation score,
      processing the second data subset to determine a model accuracy score, and
      continuing the training until a variance between the validation score and the model accuracy score is within a predetermined range;
   testing the changeset with the prediction model at least based on feature data that characterizes a generation of the preliminary modification; and
   generating an activation recommendation based on a plurality of risk factors determined from the testing.

2. The method of claim 1, further comprising generating a prediction for review time for a secondary analysis of the preliminary modification based on a portion of the feature data used to determine at least one of the plurality of risk factors.

3. The method of claim 2, further comprising generating a recommendation for a reviewer for the secondary analysis from a list of reviewers based on reviewer performance data, the review time, and at least one of the plurality of risk factors.

4. The method of claim 2, wherein the review time is generated based on the prediction model processing feature data for the changeset corresponding to a number of files changed, total number of patch sets uploaded, and total number of lines added and deleted.

5. The method of claim 2, wherein the review time is generated based on the prediction model processing feature data for the changeset corresponding to a number of reviewer comments.

6. The method of claim 2, wherein the review time is generated based on the prediction model processing feature data for the changeset corresponding to a number of reviewer comments, and a list of reviewers.

7. The method of claim 1, further comprising providing, in response to an Application Programming Interface (API) call, a characterization of at least one of the plurality of risk factors.

8. A non-transitory, computer-readable medium containing instructions that, when executed by a hardware-based processor, performs stages for implementing a review process for evaluating changes to target code for a software-based product, the stages comprising:
   aggregating data for the target code into aggregated data;
   obtaining a changeset from the aggregated data in response to receiving an indication of a preliminary modification being made to the target code;
   training a prediction model configured to test the changeset using training data obtained from a repository, the training data including a plurality of data artifacts corresponding to results from a respective plurality of code build processes;
   testing the changeset with the prediction model at least based on feature data that characterizes a generation of the preliminary modification; and
   generating an activation recommendation based on a plurality of risk factors determined from the testing,
   wherein the plurality of risk factors are determined based on the prediction model processing feature data for the changeset corresponding to an owner pass rate, a file pass rate, a reviewer pass rate, an execution status for the changeset, and a total number of lines of code inserted and deleted across all patch sets for the changeset.

9. The non-transitory, computer-readable medium of claim 8, the stages further comprising generating a prediction for review time for a secondary analysis of the preliminary modification based on a portion of the feature data used to determine at least one of the plurality of risk factors.

10. The non-transitory, computer-readable medium of claim 9, the stages further comprising generating a recommendation for a reviewer for the secondary analysis from a list of reviewers based on reviewer performance data and the review time.

11. The non-transitory, computer-readable medium of claim 9, wherein the review time is generated based on the prediction model processing feature data for the changeset corresponding to a number of files changed, total number of patch sets uploaded, total number of lines added and deleted, number of reviewer comments, and a list of reviewers.

12. The non-transitory, computer-readable medium of claim 8, the stages further comprising evaluating the prediction model before testing the changeset, by at least:
   dividing the training data into a first data subset and a second data subset,
   processing the first data subset to train the prediction model and determine a validation score,
   processing the second data subset to determine a model accuracy score, and
   continuing the training until a variance between the validation score and the model accuracy score is within a predetermined range.

13. The non-transitory, computer-readable medium of claim 9, the stages further comprising generating a recommendation for a reviewer for the secondary analysis from a list of reviewers based on at least one of the plurality of risk factors.

14. The non-transitory, computer-readable medium of claim 8, further comprising providing, in response to an Application Programming Interface (API) call, a characterization of at least one of the plurality of risk factors.

15. A system for implementing a review process for evaluating changes to target code for a software-based product, comprising:
   a memory storage including a non-transitory, computer-readable medium comprising instructions; and
   a computing device including a hardware-based processor that executes the instructions to carry out stages comprising:
      aggregating data for the target code into aggregated data;
      obtaining a changeset from the aggregated data in response to receiving an indication of a preliminary modification being made to the target code;

training a prediction model configured to test the changeset using training data obtained from a repository, the training data including a plurality of data artifacts corresponding to results from a respective plurality of code build processes;

testing the changeset with the prediction model at least based on feature data that characterizes a generation of the preliminary modification;

generating an activation recommendation based on a plurality of risk factors determined from the testing; and providing, in response to an Application Programming Interface (API) call, a characterization of at least one of the plurality of risk factors.

16. The system of claim 15, the stages further comprising generating a prediction for review time for a secondary analysis of the preliminary modification based on a portion of the feature data used to determine at least one of the plurality of risk factors.

17. The system of claim 16, the stages further comprising generating a recommendation for a reviewer for the secondary analysis from a list of reviewers based on reviewer performance data, the review time, and at least one of the plurality of risk factors.

18. The system of claim 16, wherein the review time is generated based on the prediction model processing feature data for the changeset corresponding to a number of files changed, total number of patch sets uploaded, total number of lines added and deleted, number of reviewer comments, and a list of reviewers.

19. The system of claim 15, the stages further comprising evaluating the prediction model before testing the changeset, by at least:

dividing the training data into a first data subset and a second data subset, processing the first data subset to train the prediction model and determine a validation score, processing the second data subset to determine a model accuracy score, and continuing the training until a variance between the validation score and the model accuracy score is within a predetermined range.

20. The system of claim 15, wherein the plurality of risk factors are determined based on the prediction model processing feature data for the changeset corresponding to an owner pass rate, a file pass rate, a reviewer pass rate, an execution status for the changeset, and a total number of lines of code inserted and deleted across all patch sets for the changeset.

* * * * *